United States Patent [19]

Vöneky et al.

[11] 4,445,276
[45] May 1, 1984

[54] STEPPED END-GAUGE BLOCK APPARATUS

[75] Inventors: Geza Vöneky, Stuttgart; Hans H. Schüssler, Korb, both of Fed. Rep. of Germany

[73] Assignee: Daimler-Benz Aktiengesellschaft, Stuttgart, Fed. Rep. of Germany

[21] Appl. No.: 495,942

[22] Filed: May 19, 1983

[30] Foreign Application Priority Data

May 26, 1982 [DE] Fed. Rep. of Germany ....... 3219713

[51] Int. Cl.³ .............................................. G01C 25/00
[52] U.S. Cl. ................................ 33/168 R; 33/174 H
[58] Field of Search ............. 33/168 R, 174 H, 174 R, 33/174 S, 174 PC, 125 R, 170; 73/1 J

[56] References Cited

U.S. PATENT DOCUMENTS 2,831,256 4/1958 Werle ................................ 33/168 R
4,364,182 12/1982 Jones ................................. 33/174 H

FOREIGN PATENT DOCUMENTS 263895 11/1970 U.S.S.R. ................................ 73/1 J

*Primary Examiner*—Harry N. Haroian
*Attorney, Agent, or Firm*—Barnes & Thornburg

[57] ABSTRACT

The invention relates to a crenellated, stepped end-gauge with an elongate supporting body and a plurality of end-gauge blocks which are secured thereon in a straight line. Stepped end-gauges of this type are used for checking multi-coordinate metrology equipment. In order to eliminate uncontrollable long-term influences affecting the dimensional accuracy of stepped end-gauges of this type, and in order to confer a definite temperature behavior on the stepped end-gauge, the upper surface region of the supporting body is provided with a groove which runs longitudinally and is preferably V-shaped. The eng-gauge blocks, which are preferably designed in the form of cylinders, are individually secured, spaced one behind another in the bottom of the groove. The groove expediently projects into the supporting body to a depth such that the central axis of the end-gauge blocks is axially coincident with the neutral bending axis or fiber of the supporting body. This arrangement prevents variations in the distances between the surfaces which are to be sensed, due to sagging of the stepped end-gauge under its own weight, or to deformations occurring as a result of other forces.

18 Claims, 10 Drawing Figures

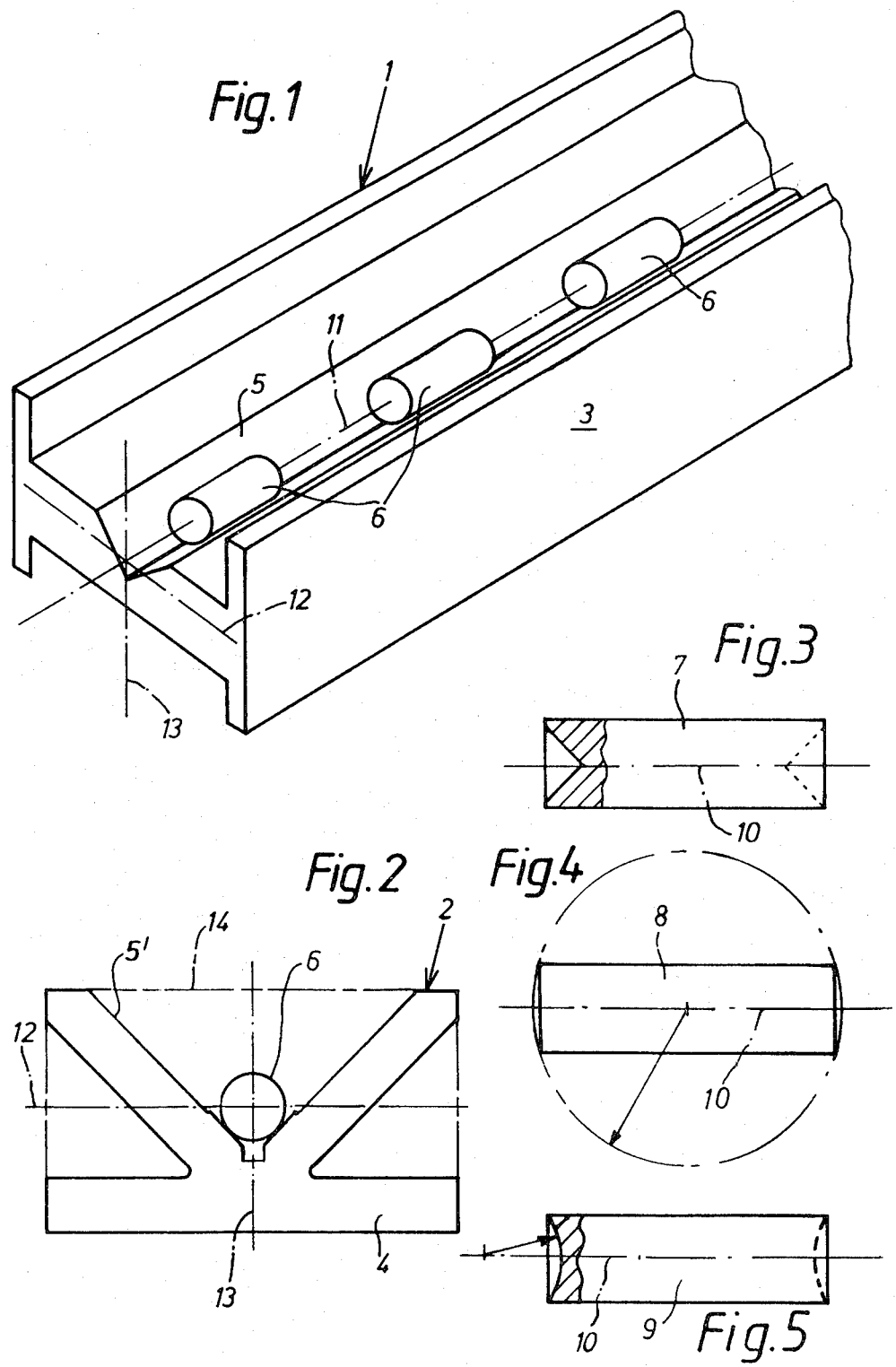

STEPPED END-GAUGE BLOCK APPARATUS

BACKGROUND AND SUMMARY OF THE INVENTION

The invention relates to a crenellated end-gauge block arrangement of the type having an elongate supporting body and a plurality of end-gauge blocks secured thereto along a straight line at defined distances from one another. For example, such a gauge-block arrangement is disclosed in the German periodical "VDI-Z", 1980, page 535 et seq., in particular page 542 and FIG. 14.

The above-noted literature reference contains a description of the use of stepped end-gauges, of this type, for checking the accuracy of multi-coordinate metrology equipment, it being possible to install these stepped end-gauges, within the measuring volume of the metrology equipment, horizontally, vertically, or at an inclination in space.

In the case of the crenellated, stepped end-gauge shown in the above-mentioned publication, short, individual end-gauge blocks, having a length of for example, 10 mm, are assembled in a row, in a staggered arrangement which produces a crenellated profile. The end-gauge blocks are, if necessary, bolted together. The resulting row of end-gauge blocks, which contains no gaps, is inserted into a supporting body as a complete unit. The row of end-gauge blocks possesses a crenellated profile both on its upper surface and on its lower surface, and it is inset into a comparatively deep elongate recess in the supporting body, which is large, overall, in the vertical direction, only every second end-gauge block projecting from the top of the supporting body, in the manner of crenellations. In this design, the end-gauge blocks are in continuous contact with one another, or are wrung against one another, as the case may be. In the course of use with such contact, long-duration processes occur in the contact zone, such as for example, the expansion of oil, molecular welding, chemical corrosion, and the like, having an unknown influence and leading to very slow changes in the dimensions of the stepped end-gauge. In addition, the bedding-in into the supporting body of the row of end-gauge blocks can cause further unknown changes in deformation and/or in length.

The known stepped end-gauge blocks are located very far from the neutral bending axis or fiber of the supporting body, and accordingly experience a comparatively large change in length as a result of the sagging of the stepped end-gauge under its own weight, depending on its attitude in space, the manner in which it is clamped in position, and its state of flexure and/or as a result of deformations due to external forces (clamping forces, touching forces, etc.). When the stepped end-gauge is heated, the effective coefficient of expansion is indefinite, because the end-gauge blocks, which for their part, are made of steel, and the supporting body made of grey cast iron, possess different coefficients of expansion under any given conditions. These dissimilar expansions can result in temperature-dependent curvature, in the manner of a bimetallic strip. Since end-gauge blocks are manufactured only in exact decimal lengths, only corresponding spacings can be achieved in the case of this type of stepped end-gauge. As a result of unavoidable, albeit small tilting and/or convexity of the opposing contact surfaces within the uninterrupted row of end-gauge blocks, corresponding errors can accumulate so that it is impossible to guarantee adequate parallelism of the surfaces which are touched within the crenellated stepped end-gauge at every point, in the case of every stepped end-gauge, and/or at every point in time. The last-mentioned possibility of error can be avoided, or minimized, only by carrying out a series of very precise initial measurements, and by a compensating assemblage of different end-gauge blocks possessing errors of the same nature, but the other disadvantages remain unaffected.

In the past, stepped end-gauges have even been machined, with crenellations from the solid, in which the touchable surfaces on the one hand, and the supporting body on the other hand, are composed of the same material, and constitute a homogeneous workpiece. Although this type of crenellated stepped end-gauge avoids many of the above-mentioned disadvantages, it is nevertheless unavoidable, even in the case of this type of stepped end-gauge, that the tops of the crenellations lie outside the neutral bending axis, and the distances between the surfaces which are to be touched consequently vary as a result of the sagging of the stepped end-gauge under its own weight and under the action of external forces. Since, when being machined from the solid, the workpiece is comparatively large, it is thus impossible to produce the surfaces which are to be touched to such a high quality and parallelism as in the case of comparatively small end-gauge blocks. In the case of large stepped end-gauges, it is difficult, or even impossible to harden the entire body, or even to harden only the surfaces which are to be touched. Superfinishing the numerous surfaces to be touched by lapping, is likewise beset with difficulties.

In addition to these crenellated stepped end-gauges, staircase-like stepped end-gauges have also previously been assemblied from end-gauge blocks of different lengths which were clamped, as a group, on a supporting base body (compare, in addition to the literature reference already mentioned in the introduction, also "VDI-Berichte", No. 378, 1980, page 21 et seq.), but the surfaces of a stepped end-gauge of this type which are to be touched possess no common measurement axis.

An object of the invention is to provide a crenellated stepped end-gauge which avoids the above-mentioned disadvantages, and which thus undergoes no uncontrolled changes which affect the distances between the surfaces which are to be touched.

This object is achieved according to the invention by providing the end-gauge block supporting surfaces of the supporting block at a longitudinally extending groove in the supporting body, in which groove the end-gauge blocks are disposed and individually secured, one behind the other, on the flanks of this groove. Preferably the end-gauge blocks are designed in the form of cylinders with axes extending parallel to the longitudinal extent of the groove. By virtue of the separate installation of the various end-gauge blocks in a groove, which is preferably V-shaped, no effects can result from uncontrolled long-term processes in the contact zone between end-gauge blocks which are wrung or pressed against one another, because an interspace is always present between adjacent end-gauge blocks, and contact zones of the above-mentioned nature are avoided. The coefficient of expansion of the supporting body is now the factor which uniquely determines the unavoidable, temperature-dependent dimensional changes of the stepped end-gauge, for which supporting body it is possible to select a material which appears suitable, for example steel, aluminum, granite, or invar, without being limited in any way to coefficients of expansion, or similar parameters. On the supporting body, it is merely necessary that the flanks be accurately machined in the region of the bottom of the V-shaped groove, less accurate machining sufficing for the other surfaces of the supporting body, which requires no hardening treatment. The small end-gauge blocks, which are inserted permanently, can be hardened and precision-finished without difficulty, thereby enhancing their wear-resistance, accuracy of shape, and surface quality.

By virtue of the fact that the longitudinal positions of the individual end-gauge blocks can be arranged at will, it is also possible to produce very "crooked" dimensions on the stepped end-gauge. The orientation of the end-gauge blocks, in the supporting body is definitely fixed by reason of the groove. The maximum deviation from the ideal shape results merely from the errors in the accurately machined groove and, in each case, the individual error affecting one end-gauge block. No accumulation of geometrical errors occurs within a comparatively long row of end-gauge blocks.

The cross-section of the supporting body is designed in a manner such that the central axes of the end-gauge blocks, which are placed in the bottom of the groove, are located within the neutral bending axis or fiber of the supporting body. As a result, length changes due to deformations of the stepped end-gauge, under its own weight and/or under the action of external forces, are avoided, only very small and for the most part, negligible angular changes affecting the surfaces which are to be touched being still possible. Since, therefore, sagging has no appreciable influence on the distance between the surfaces which are to be touched, the cross-section of the supporting body can be designed to be both light and small, which renders the stepped end-gauge easier to handle. Due to the fact that the V-shaped groove is deep, the end-gauge blocks are located in a manner in which they are protected, while at the same time they are freely accessible within a widely diverging angular space. As a result, lateral clamping of the stepped end-gauge is also possible.

In addition to plane-parallel end-faces, spherically domed surfaces or conical shapes can also be considered for the preferably cylindrical end-gauge blocks, which end-faces are for the most part the faces which are to be touched.

Further objects, features, and advantages of the present invention will become more obvious from the following description when taken in connection with the accompanying drawings which show, for purposes of illustration only, several embodiments in accordance with the present invention.

BRIEF DESCRIPTION OF THE INVENTION

FIG. 1 is an oblique perspective partial view of a first preferred embodiment of a stepped end-gauge block apparatus constructed in accordance with the invention;

FIG. 2 is a schematic end view of a further preferred embodiment of a stepped end-gauge constructed in accordance with the invention;

FIG. 3 is a side part-sectional view of an end-gauge block, constructed in accordance with a first preferred embodiment of the invention for use with the stepped end-gauges of this invention;

FIG. 4 is a side part-sectional view of an end-gauge block, constructed in accordance with a second preferred embodiment of the invention for use with the stepped end-gauges of this invention;

FIG. 5 is a side part-sectional view of an end-gauge block, constructed in accordance with a third preferred embodiment of the invention for use with the stepped end-gauges of this invention;

DETAILED DESCRIPTION OF THE DRAWINGS

Figure 6:
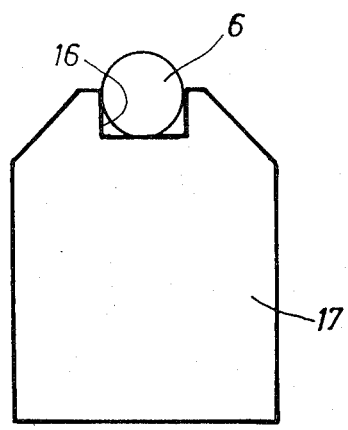
FIG. 6 is a schematic cross-sectional view of a third preferred embodiment of a stepped end-gauge constructed in accordance with the invention.

The stepped end-gauge 1 shown in FIG. 1 possesses a supporting body 3 which is essentially I-shaped or double-T-shaped, the web of this body between the two end-or edge flanges being of particularly heavy design. The normal position of the stepped end-gauge is one in which the transverse web runs horizontally. The external outline of the supporting body 3 corresponds to a rectangle, as an enveloping outline, the ratio of the sides of the rectangle being such that it would be capable of standing in a stable manner even on the narrow sides. Thus, the supporting body can also be used when placed on its side.

In the middle of the transverse web of the supporting body, a V-shaped groove is machined into one side of the web, running longitudinally, the machining of this groove being very accurate with regard to the quality of its shape and to the quality of its surface finish. The bottom of the groove projects to below the axis 12 of the areal moment of inertia with respect to sagging in the vertical direction. Moreover, this amount, by which the bottom of the groove extends below the axis 12 is adjusted, in conjunction with the diameter of the end-gauge blocks 6, in a manner such that the central axis 10 of the end-gauge blocks coincides with the neutral bending axis or fiber 11 of the supporting body. The neutral bending axis or fiber 11 of the supporting body is determined by the point at which the two axes 12 and 13 of the areal moments of inertia intersect. Sagging takes place in the vertical direction, with respect to axis 12, and horizontal bending takes place with respect to axis 13. As a result of this arrangement, sagging of the supporting body has no effect on the distances between those surfaces of the end-gauge blocks 6 which are to be touched.

Furthermore, the end-gauge blocks 6 lie in the very deep V-shaped groove in a manner such that they are protected, so that the dimensional accuracy of the surfaces which are to be touched is also not subject to adverse effects arising from somewhat careless treatment of the stepped end-gauge. The V-shaped groove 5 is freely accessible within an extensive fan-shaped angular space, so that in addition to a horizontal position of the transverse web as illustrated in FIG. 1, setting-up is also possible in a position in which the cross-section has been rotated through 90° to have the supporting body 3 resting on one of the two flanges of its double-T-shape. In this case, the end-gauge blocks must be touched obliquely from above, or from the side. The wide, fan-shaped access to the V-shaped groove, extending over an angular space of at least 90°, is also important for the manufacture of the supporting body, since it should be possible to grind the flank of each groove individually, preferably by using the periphery of a large grinding wheel. By making the areal moments of inertia for the bending of the support body 3 about the axes 12 and 13 of identical magnitude, the amounts by which the stepped end-gauge sags are equal for both ways of setting-up, so that account must be taken of identical error-influences due to bending, for both methods of clamping.

In the illustrative embodiment of a stepped end-gauge 2, illustrated in FIG. 2, the supporting body 4 is designed with a K-shaped cross-section. The V-shaped groove 5' is formed between the two longitudinal webs which project upwards in the shape of a "V", this groove likewise permitting a wide, fan-shaped unoccupied space for access to the end-gauge blocks 6. In this case, too, setting-up is equally possible in the horizontal position, illustrated in FIG. 2, or in a vertical position following rotation through 90°. Also in this illustrative embodiment of FIG. 2, the cross-section of the supporting body 4 is configured in a manner such that a rectangle 14 (dashed lines) which is capable of standing in a stable manner, on all sides, is drawn around the cross-section of the supporting body, as an enveloping outline. Only in the region of the bottom of the groove are the flanks of the V-shaped groove accurately machined, for which purpose, in the illustrative embodiment shown, a small step is provided in the flanks of the groove.

The following materials can be used for the supporting body according to especially preferred embodiments so as to optimize the desired characteristics: steel (high modulus of elasticity), aluminum (low weight), granite (low internal stresses), or invar (low thermal expansion).

The end-gauge blocks 6 are preferably of cylindrical design, with a precisely machined shell surface, and their end-faces being designed to be plane-parallel. The end-gauge blocks are manufactured from a dimensionally stable material. By virtue of their small size and simple shape, the end-gauge blocks can be machined very accurately, and to a very high-quality surface finish, and they can be inspected and initially measured very accurately. A hardening treatment can also be carried out if the blocks are designed to be made of steel. Being of cylindrical shape, the end-gauge blocks can be aligned very accurately, in an accurately defined manner, along the V-shaped groove 5, 5'. The end-gauge blocks can be anchored to the bottom of the groove by means of an adhesive, or by a welding operation involving a very low input of heat. Clamping, by means of claws, is also contemplated by this invention, which would admittedly be more expensive, but would leave open the possibility of altering the assembly of the stepped end-gauge.

Instead of a plane-parallel configuration of the end-faces of the end-gauge blocks, differently-shaped end-faces are also contemplated by this invention. In the case of the illustrative embodiment of an end-gauge block 7, illustrated in FIG. 3, hollow cones are machined on the end-faces, concentrically with the central axis 10. This enables the touching sphere to be centered in the hollow cone, thereby fixing a measuring point not only in the longitudinal direction of the stepped end-gauge, but also in the two transverse directions.

The illustrative embodiments of end-gauge blocks 8 and 9, in FIGS. 4 and 5 respectively, show spherical cups in the region of the end-faces of the end-gauge blocks, the spherical cups in the end-gauge block 8 according to FIG. 4, being domed in a convex manner, while the spherical cups on the end-faces of the end-gauge block 9 according to FIG. 5, are made concave. The spherical cups on the two opposite end-faces of the end-gauge block 8 can advantageously, according to FIG. 4, form parts of the surface of a continuous spherical surface, the center of which is located precisely on the longitudinal axis of the end-gauge block. In the case of the convex spherical cups too, the associated sphere-center should be located on the central axis of the end-gauge block. As a result of the spherical shape of the end-faces on the end-gauge blocks, it is possible to present a comparatively difficult measuring task to the item of measuring equipment which is to be checked, namely to determine the position of the center of a spherical surface by touching various points on it.

Figure 10:
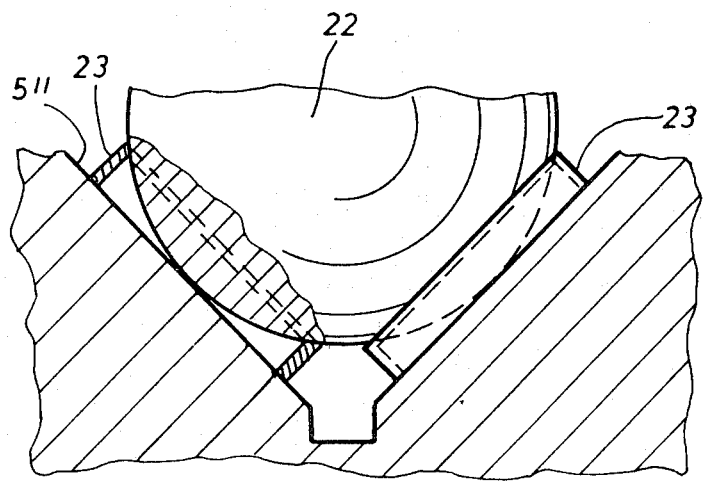
FIG. 10 is a schematic cross-sectional view of a seventh preferred embodiment of a stepped end-gauge constructed in accordance with the invention.
Figure 9:
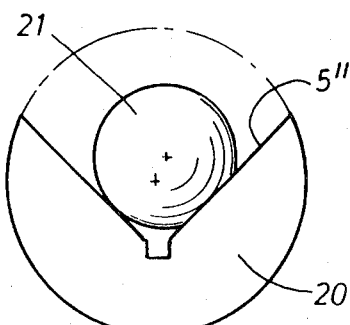
FIG. 9 is a schematic cross-sectional view of a sixth preferred embodiment of a stepped end-gauge constructed in accordance with the invention.
Figure 8:
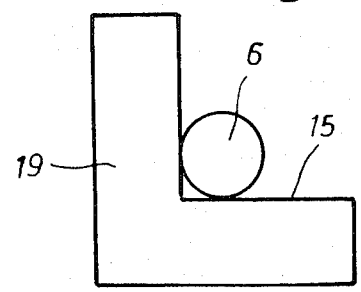
FIG. 8 is a schematic cross-sectional view of a fifth preferred embodiment of a stepped end-gauge constructed in accordance with the invention.

As FIGS. 9 and 10 show, it is even contemplated by the invention to install complete spheres 21 and 22 respectively, in the V-shaped grooves, employing an anchoring technique which uses an adhesive. To a certain extent, stepped end-gauges of this type represent a row of spheres, which are favored for the purpose of checking multi-coordinate measuring equipment, but which could not hitherto be produced to the present dimensional accuracy. It is also contemplated, of course, to install spheres and cylinders in the groove in any desired sequence. The spheres can be glued into the groove, as can also the cylindrical end-gauge blocks, or they can be welded in or secured by claws.

FIGS. 9 and 10 show two different possible attachment methods, which are both suitable for the glueing technique, or for the welding technique. The spheres 21 of the stepped end-gauge according to FIG. 9 are flattened off, at one point by a defined amount which is, above all, equal in the case of all the spheres, and this flat point is placed on one flank of the groove, while the sphere 21 touches the opposite flank of the groove only at one spot. Although these spheres are located slightly off-center with respect to the center of the groove, they nevertheless lie on a straight line, both in the lateral direction and in the vertical direction. The spheres 21 can be welded or glued at the contact positions. Instead of being flattened off at one point, flattening-off at two points at an angle, would also be conceivable, conforming accurately to the angle between the flanks of the groove 5", but this would be more difficult to manufacture. A certain inaccuracy with regard to the matching of the angles could be compensated by interposing a needle-shaped cylinder between the flank of the groove and the flattened-off area on one side, which would produce a line contact.

In the illustrative embodiment of the means for attaching the sphere, shown in FIG. 10, two supporting rings 23 are used, which surround the points at which the sphere 22 touches the flanks of the groove. These rings can be attached both to the sphere and to the flanks of the groove, by welding or glueing. Mechanical clamping from the bottom of the groove, is also contemplated, using a pull-in screw. In the axial direction, the supporting rings are machined very slightly undersize, or their diameters are machined very slightly oversize, so that there can be no doubt that the sphere touches the flank of the groove.

In addition, the illustrative embodiments according to FIGS. 6 to 9 show that even simple basic shapes can be used as basic profile-sections for the supporting body of the stepped end-gauge, this being expedient when the accuracy requirements are less high, but a low price is required. A rectangular solid profile-section has been used in the illustrative embodiments according to FIGS. 6 and 7.

A groove 16 of rectangular shape is provided in the stepped end-gauge according to FIG. 6, in which the supporting body is marked 17. The width dimension of the groove is machined slightly undersize with respect to the diameter of the cylindrical end-gauge blocks 6, so that the groove securely holds the end-gauge blocks under prestress. The depth of the groove 16 corresponds to only rather more than its width, so that almost half of each end-gauge block projects from the groove, and is also accessible from the side. It is also possible of course, for square-machined end-gauge blocks to be pressed into the groove 16, as is also possible in the case of the other grooves 5, 5', 5", or 15. The end-gauge blocks, thus clamped in, can be additionally secured by welding or glueing.

Figure 7:
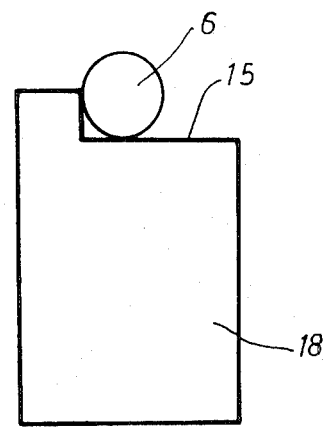
FIG. 7 is a schematic cross-sectional view of a fourth preferred embodiment of a stepped end-gauge constructed in accordance with the invention.

The stepped end-gauge according to FIG. 7 not only possesses an inexpensive, rectangular, solid profile-section which facilitates manufacture, as the basic shape for the supporting body 18, but an L-shaped groove 15 is also employed, which is likewise easy to produce, because its flanks lie parallel to the lateral surfaces of the supporting body. A similar situation applies in the case of the supporting body 19 of the stepped end-gauge according to FIG. 8, which is machined from an angle-section. In the case of the stepped end-gauge according to FIG. 9, possessing the supporting body 20, circular-section material is used as the basic body.

While we have shown and described several embodiments in accordance with the present invention, it is understood that the same are not limited thereto but are susceptible to numerous changes and modifications as would be known to those skilled in the art of the present disclosure and we therefore do not wish to be limited to the details shown and described therein but intend to cover all such changes and modifications as are encompassed by the scope of the appended claims.

We claim:

1. Crenellated stepped end-gauge apparatus with an elongate supporting body and a plurality of end-gauge blocks which are secured, spaced by defined distances, along a straight line, wherein the supporting body possesses a groove on its upper surface which runs longitudinally, the end-gauge blocks, which are preferably designed in the form of cylinders, being individually secured one behind another on the flanks of this groove.

2. Apparatus according to claim 1, wherein the supporting body is designed with a cross-sectional shape such that its neutral fiber or axis which runs longitudinally, runs approximately through the central axis of the end-gauge blocks.

3. Apparatus according to claim 1, wherein the flexural strength of the supporting body is of approximately the same magnitude in two mutually perpendicular transverse directions.

4. Apparatus according to claim 2, wherein the flexural strength of the supporting body is of approximately the same magnitude in two mutually perpendicular transverse directions.

5. Device according to claim 1, wherein an unoccupied space, which is fan-shaped in cross-section, is provided above the groove, along its entire course, said groove being V-shaped.

6. Apparatus according to claim 4, wherein an unoccupied space, which is fan-shaped in cross-section, is provided above the groove, along its entire course, said groove being V-shaped.

7. Device according to claim 1, wherein the cross-section of the supporting body is configured in a manner such that it fills at least the corners of a rectangle imagined as an enveloping outline and is capable of standing in a stable manner on all sides.

8. Device according to claim 3, wherein the cross-section of the supporting body is configured in a manner such that it fills at least the corners of a rectangle imagined as an enveloping outline and is capable of standing in a stable manner on all sides.

9. Device according to claim 4, wherein the cross-section of the supporting body is configured in a manner such that it fills at least the corners of a rectangle imagined as an enveloping outline and is capable of standing in a stable manner on all sides.

10. Device according to claim 1, wherein the groove is designed in the shape of a "V" or "L".

11. Device according to claim 1, wherein the groove is designed in the shape of a rectangular slot.

12. Gauge block apparatus for calibrating measuring instruments which have feeler members which engage surface points, comprising:
an elongated supporting body possessing a groove which runs longitudinally thereof, said groove exhibiting precision machined groove flank portions,
a plurality of gauge blocks disposed at a spacing from one another in said groove,
and fastening means for separately securing the gauge blocks to said supporting body with the gauge blocks engaging the supporting body only at said groove flank portions.

13. Apparatus according to claim 12, wherein said gauge blocks are end-gauge blocks which are cylindrical in shape, the cylindrical outer surfaces of the end-gauge blocks contacting the groove flank portions when secured in an in-use position by the fastening means.

14. Apparatus according to claim 13, wherein said fastening means includes adhesive means.

15. Apparatus according to claim 13, wherein said fastening means includes low temperature welding means.

16. Apparatus according to claim 12, wherein the supporting body is designed with a cross-sectional shape such that its neutral fiber or axis which runs longitudinally, runs approximately through the central axis of the end-gauge blocks.

17. Apparatus according to claim 16, wherein the flexural strength of the supporting body is of approximately the same magnitude in two mutually perpendicular transverse directions.

18. Apparatus according to claim 17, wherein the cross-section of the supporting body is configured in a manner such that it fills at least the corners of a rectangle imagined as an enveloping outline and is capable of standing in a stable manner on all sides.

* * * * *